United States Patent

[11] 3,624,718

[72] Inventor Thomas A. Ribich, Cleveland, Ohio
[21] Appl. No. 98,610
[22] Filed Dec. 16, 1970
[45] Patented Nov. 30, 1971
[73] Assignee The Weldon Tool Company
Continuation-in-part of Ser. No. 806,985,
Mar. 13, 1969, abandoned

[54] METHOD FOR PRODUCING A BALL-END MILL
7 Claims, 31 Drawing Figs.

[52] U.S. Cl. .............................................. 76/101 R,
51/225, 288; 90/11.42
[51] Int. Cl. ............................................... B21k 5/00
[50] Field of Search .................................... 76/101 A,
108; 51/288, 225

[56] References Cited
UNITED STATES PATENTS
2,352,489 6/1944 Melin ....................... 51/225UXR
2,902,259 9/1959 Tilden ..................... 76/101AUXR
3,365,843 1/1968 Robinson ................. 51/225

Primary Examiner—Bernard Stickney
Attorneys—Woodling, Krost, Granger & Rust

ABSTRACT: A ball-end end mill is produced by a method and apparatus which performs machining operations on a ball-end end mill blank which blank includes a shank from which extends a plurality of helically extending peripheral teeth which terminate short of the end of the blank which end is a substantially hemispherical surface. The end of the blank is machined so as to complete the teeth by presenting the end to a rotating milling cutter whose axis is generally parallel to a horizontal reference plane. A vertical reference plane normal to the axis of the milling cutter is also normal to the horizontal reference plane. The axis of the blank lies in this vertical reference plane and is preferably disposed at an acute angle α on the order of 35 degrees with the hemispherical end above the horizontal reference plane. The end of the angularly disposed blank is brought longitudinally into the milling cutter a short distance and then a pivoting action occurs to pivot the blank about an axis parallel to the vertical reference plane through an angle of on the order of the same number of degrees as the helix angle of the peripheral teeth, to arcuately form the cutting face on one tooth and the trailing edge on an adjacent tooth. The blank and cutter are separated, the pivoting action reversed, the blank is indexed about its own axis to bring another portion of the end of the blank into position relative to the cutter, and the above operation is repeated to arcuately form the cutting face on another tooth and the trailing edge on another adjacent tooth. This procedure is repeated until all of the teeth are formed. The teeth are finally finish formed by use of another milling cutter of slightly different form by essentially the same operations. A machining operation is next performed on the end of the formed teeth where they all meet at the axis of the tool which involves making an axial cut or notch in all but two diametrically disposed teeth, to separate them slightly from the tool axis. The above operations are accomplished in the unhardened condition of the blank. The blank is then hardened and thereafter ground to form a cutting edge on the two diametrically disposed teeth, each of which extends substantially to the axis of the tool and includes primary and secondary relief surfaces. Cutting edges are also ground on the other teeth and include primary and secondary relief surfaces.

INVENTOR.
THOMAS A. RIBICH

INVENTOR.
THOMAS A. RIBICH

INVENTOR.
THOMAS A. RIBICH

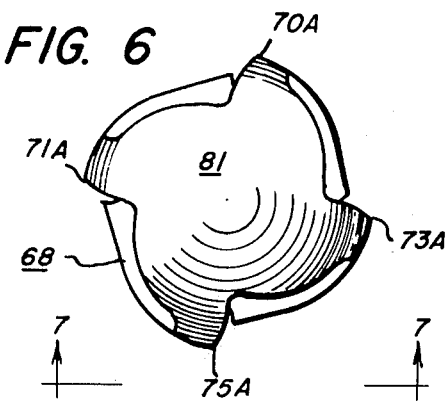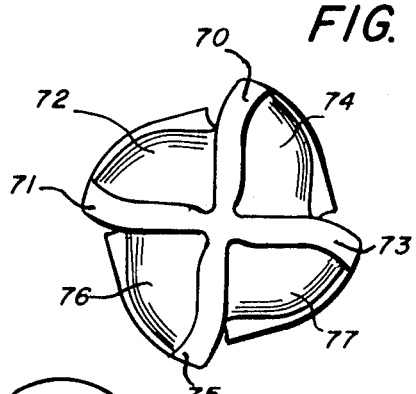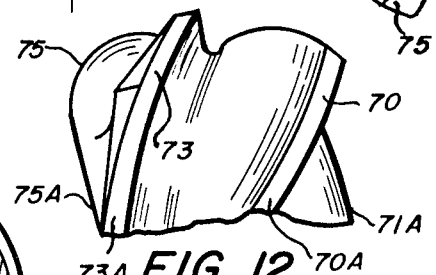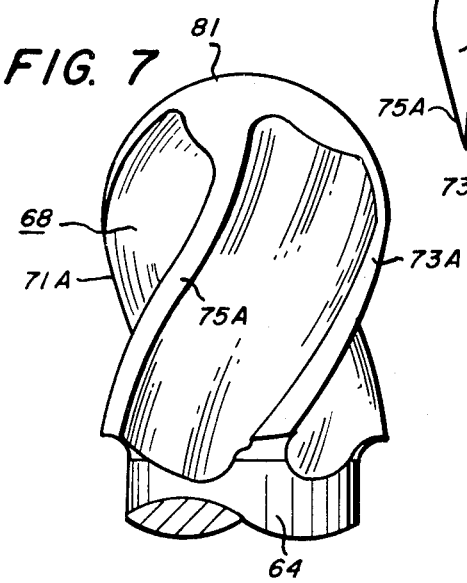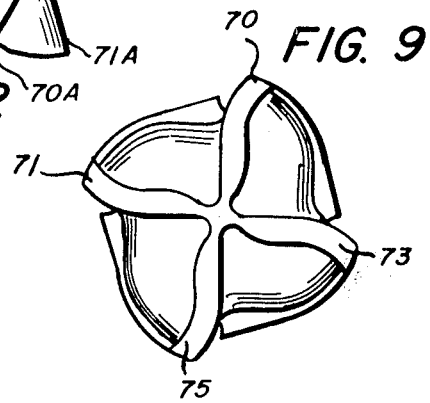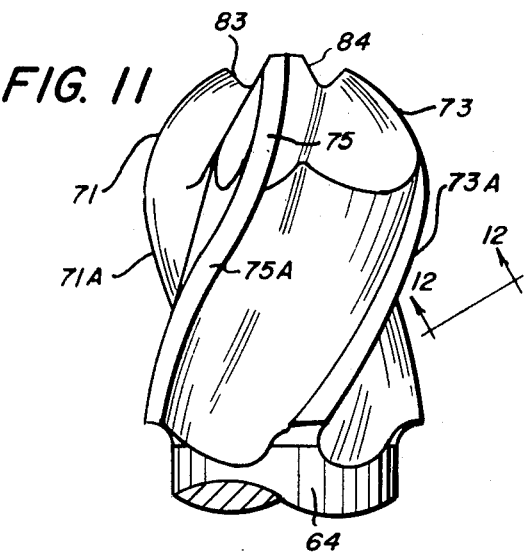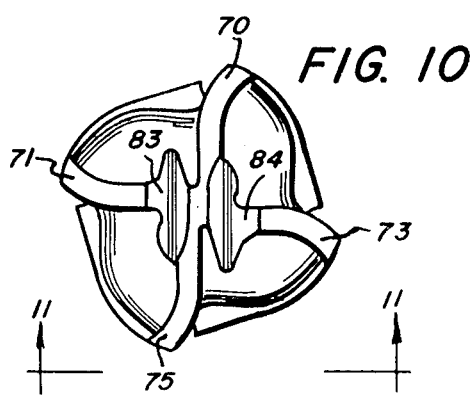

INVENTOR
THOMAS A. RIBICH

INVENTOR.
THOMAS A. RIBICH

INVENTOR.
THOMAS A. RIBICH
BY
Woodling Krost Granger + Krost
Attys.

METHOD FOR PRODUCING A BALL-END MILL

This application is a continuation-in-part application of Ser. No. 806,985, filed Mar. 13, 1969, now abandoned.

The present invention has as its principal object a method and apparatus whereby ball-end end mills can be mass produced with consistently accurate results. The invention enables one to repeat the geometry of the tool in the ball region and enables one to produce on the joined straight portions of two flutes which go to center, a radial rake angle of substantially zero (for a desired number of degrees on either side of center, for example 15 degrees) so that when the tool is resharpened this rake angle can be maintained consistently the same which in turn results in consistent cutting qualities in the tool.

Other objects and a fuller understanding of this invention may be had by referring to the following description and claims, taken in conjunction with the accompanying drawings, in which:

FIG. 6 is an end view of a ball-end end mill blank which is the starting item utilized in the practice of the teachings of the present invention;

FIG. 7 is an elevational view of the ball-end end mill blank taken generally along the line 7-7 of FIG. 6;

FIG. 8 is an end view of the ball-end end mill blank shown in FIG. 6 after the rough or first milling operation has been performed on each of the four flutes;

FIG. 9 is an end view of the ball-end end mill blank after the finish or second milling operation has been performed on each of the four flutes;

FIG. 10 is an end view of the ball-end end mill blank after a notching operation has been performed by another milling cutter to complete the end of the ball-end end mill;

FIG. 11 is a view taken generally along the line 11-11 of FIG. 10;

FIG. 12 is a view taken generally along the line 12-12 of FIG. 11;

The apparatus of the present invention is best seen in FIGS. 1 through 5 of the drawings and is for the purpose of producing ball-end end mills from a ball-end end mill blank which will be described in more detail hereinafter. This apparatus serves to mount both the milling cutters and the ball-end end mill blank and causes the two to be properly moved relative to each other so that the correct geometric configuration is provided on the end of the finished ball-end end mill.

Figure 1:
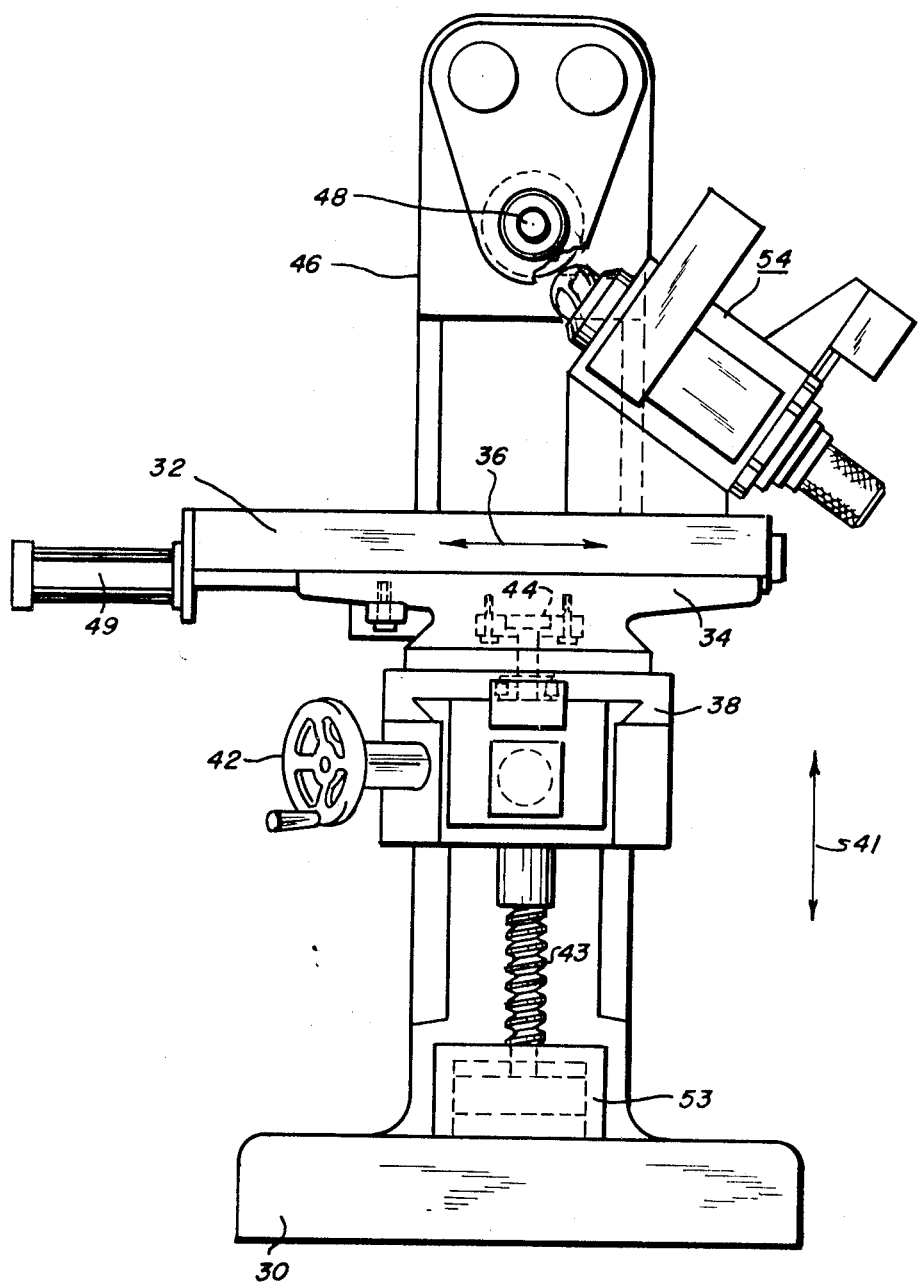
FIG. 1 is an elevational view of the apparatus of the present invention.
Figure 2:
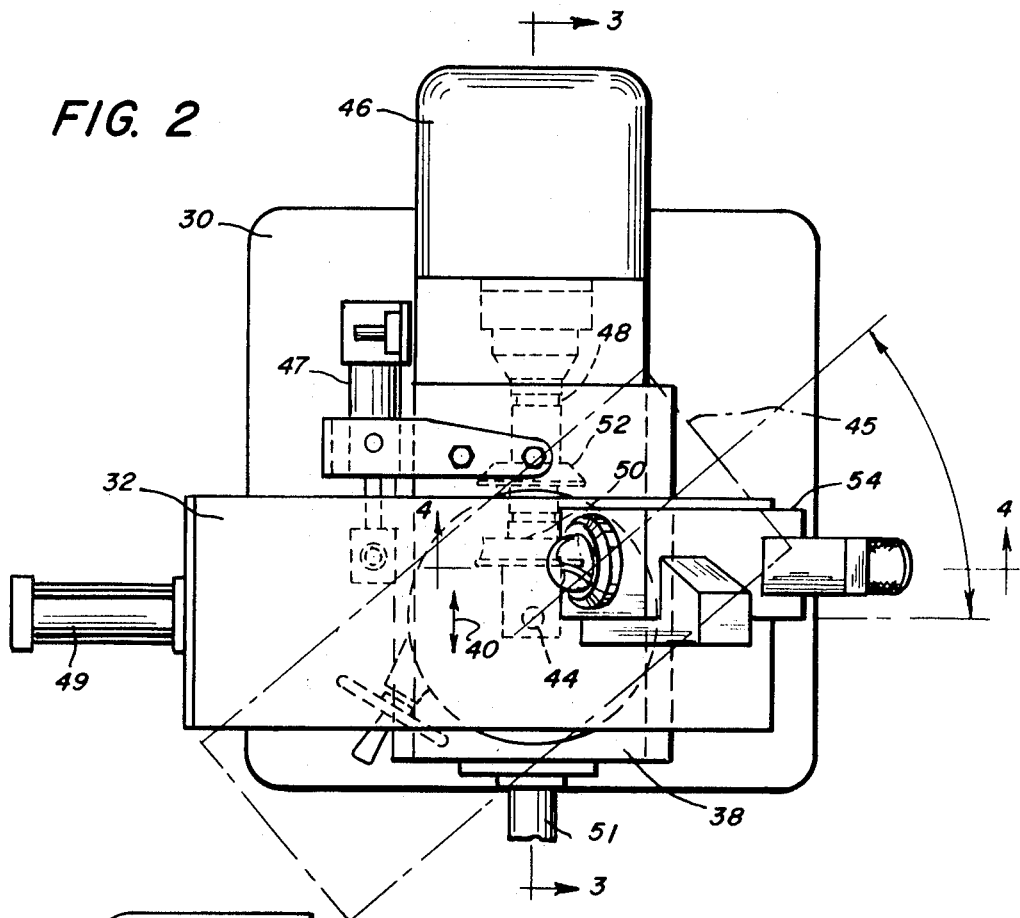
FIG. 2 is a plan view of FIG. 1.
Figure 3:
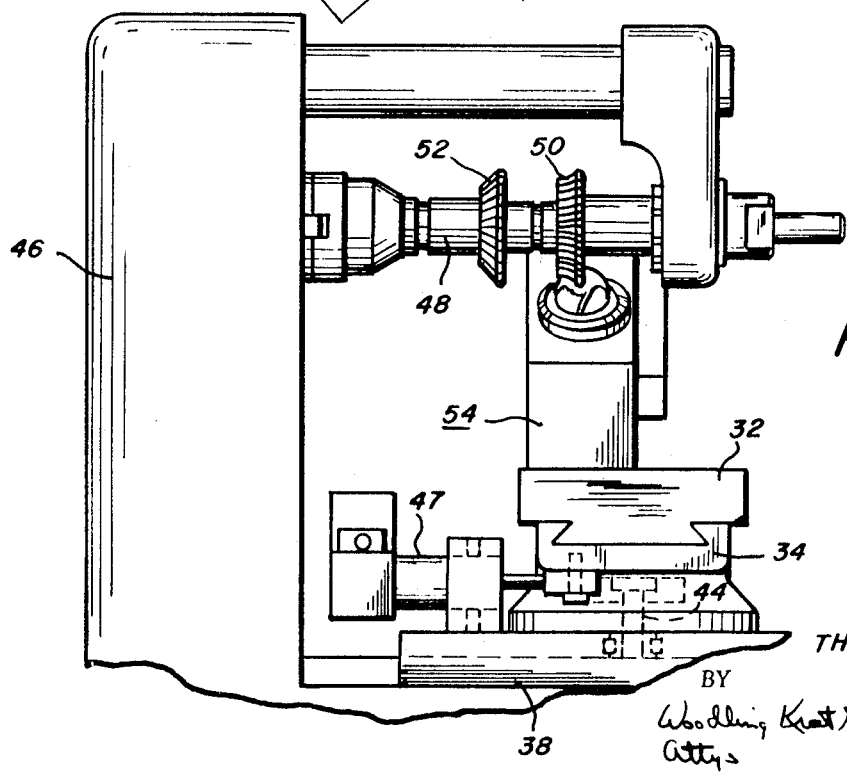
FIG. 3 is a view taken generally along the line 3-3 of FIG. 2.

To this end the apparatus includes a base 30 which serves to mount a generally horizontally disposed table 32. The table is carried on ways in a support 34 and this enables the table to be moved back and forth in the directions indicated by arrows 36. The support 34 in turn is carried on a cross slide 38 which enables the support 34 and the table 32 which is carried thereby to be moved back and forth in a direction at right angles to the direction 36. This direction of movement is indicated by the arrows 40 in FIG. 2. The table 32 as well as the support 34 and slide 38 are also adapted to be moved vertically up and down in the direction of arrows 41 by cylinder 53 in the functioning of the apparatus and a fine vertical adjustment is provided by means of the hand crank 42 which actuates a screw 43. The apparatus is also provided with a mechanism for rotating the support 34 and as a result the table 32 carried thereby, about a vertical pivot 44 substantially between the limits of the full line position shown in FIG. 2 to the dot-dash position 45 shown in FIG. 2. This includes a hydraulic cylinder 47 mounted as shown in FIGS. 2 and 3.

A vertical support 46 extends from the base for the purpose of rotatively carrying a milling cutter shaft 48. The shaft 48 is adapted for rotation above the table 32 and as will be seen the axis of the shaft 48 is generally transverse or at right angles to the direction 36 which is one of the directions of movement of the table 32. A first milling cutter 50 or relieving milling cutter is carried by the shaft for rotation therewith and a second milling cutter 52 or flute cutter is also carried by the shaft 48 in precise axially spaced relation to cutter 50. Rotation of the shaft 48 causes rotation of the cutters.

Figure 4:
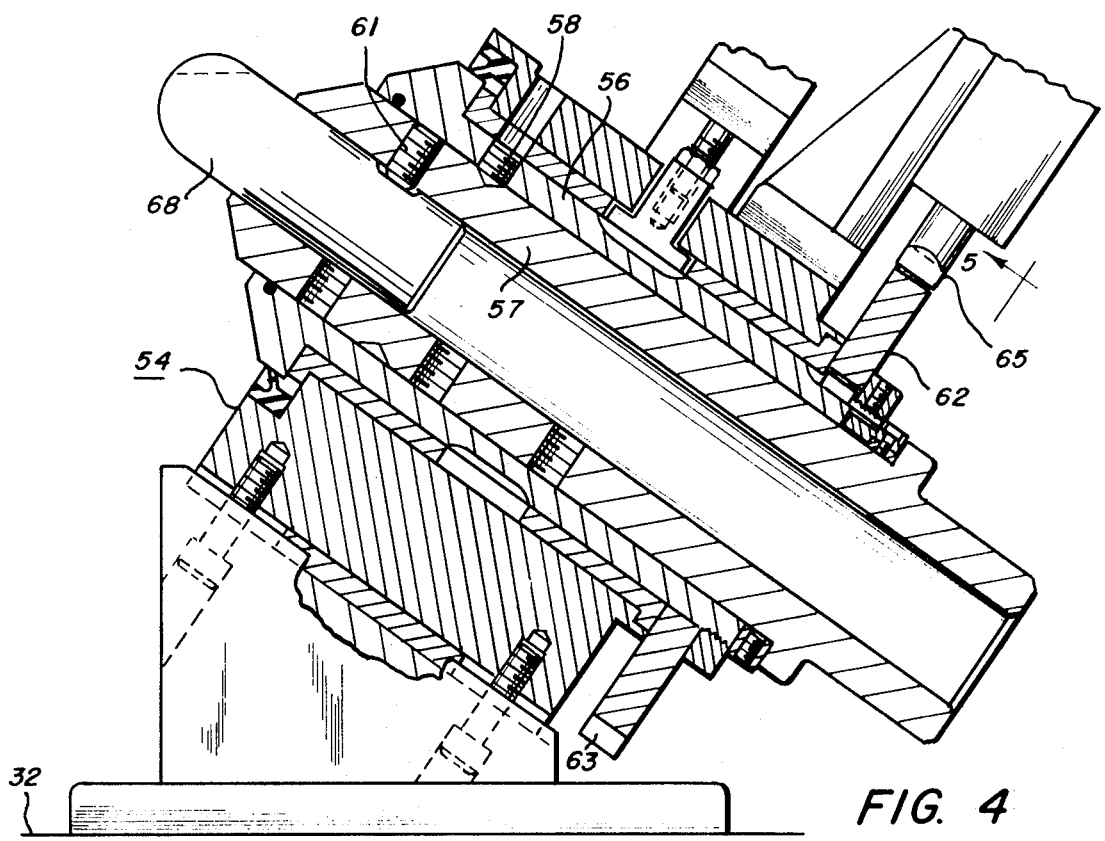
FIG. 4 is an enlarged view taken generally along the line 4-4 of FIG. 2.
Figure 5:
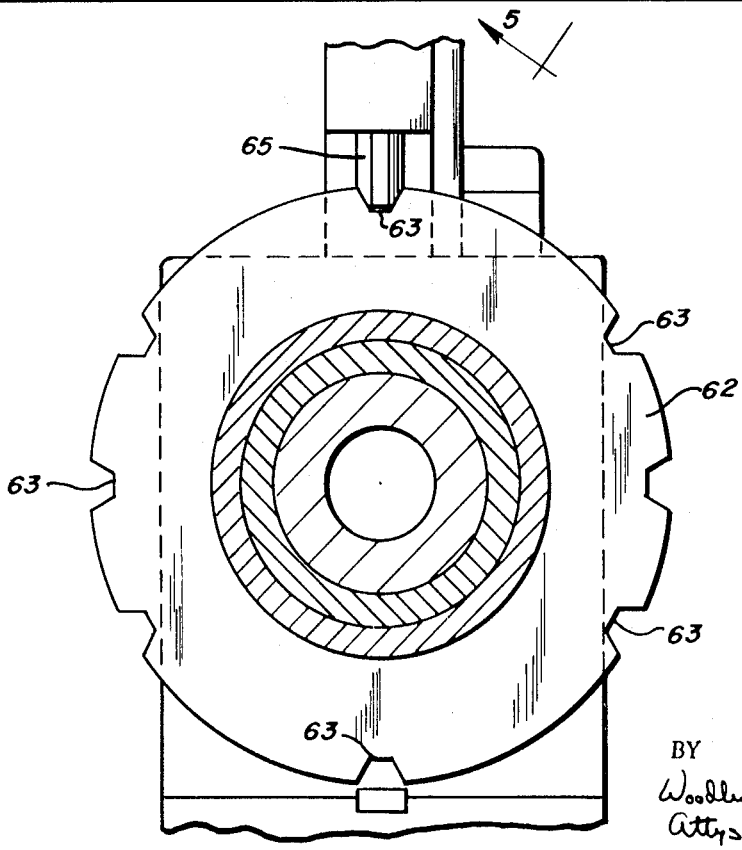
FIG. 5 is a view taken generally along the line 5-5 of FIG. 4.

A work holder 54 is fixedly secured to the table 32 in the manner best shown in FIG. 4 and this work holder serves the function of properly and securely holding the ball-end end mill blank as it is manipulated relative to the milling cutters 50 and 52. In this respect, the work holder includes a housing 56 which has an axially extending bore therein. A blank holding sleeve 57 resides within the bore in the housing 56 and is held in the correct position within the housing by means of a set screw 58. A ball-end end mill blank 68 is held within the axial opening in sleeve 57 (after being properly angularly and axially oriented with respect to the sleeve) by means of a threaded member 61 engaging a flat surface portion on the blank 68. An indexing disk 62 is secured to the rear end portion of the housing 56. A detent 65 (FIG. 5) is adapted to reside in notches in the indexing disk 62 so as to properly angularly locate the housing 56 and as a result the ball-end end mill blank 68, with respect to the cutters 50 and 52. It will be seen that these notches are appropriately located to accommodate either a four-fluted ball-end end mill blank or a six-fluted ball-end end mill blank. When a four-fluted mill is being machined, the four notches which are located 90° apart are utilized, and when a six-fluted end mill is being machined, the six notches which are located 60° apart are utilized. The work holder 54 and the associated structure are designed so as to locate the axis of the blank 68 at on the order of a 35° angle with respect to the reference plane within which the table 32 lies, which in this particular embodiment is a horizontal reference plane. An angle of on the order of 35° is considered to be substantially ideal for the machining of the geometry on the end of a ball-end end mill in accordance with the present teachings, however, this angle may be varied somewhat within limits. This particular angle has been arrived at because the teeth on the ball end of the mill which are machined blend in extremely well with the continuation of the peripheral teeth which are already on the blank. This angle might be reduced two or three degrees or it might be increased above the 35° angle up to around 40° if desired. It is possible that a workable configuration could be produced if the angle were increased to 45°, however, this is not preferred over the 35° angle.

The work holder 54 is laterally adjustable in the direction of arrows 40 with respect to the table 32. This is to vary the distance between the pivot 44 and the work holder for the purpose of varying the radius of the arc produced on the face of a tooth in the ball region of the workpiece. This is necessary because the arc radius varies for different diameter tools.

The back and forth movement of the table 32 in directions 36 and 40 is accomplished by hydraulic cylinders 49 and 51 respectively and vertical movement 41 is caused by hydraulic cylinder 53. The starting and stopping sequence is controlled by a master cam and appropriate limit switches and stops positioned in the path of movement of the various movable parts of the apparatus. This control mechanism has not been described in detail because it is substantially conventional in nature and does not form a part of the present invention.

Figure 13:
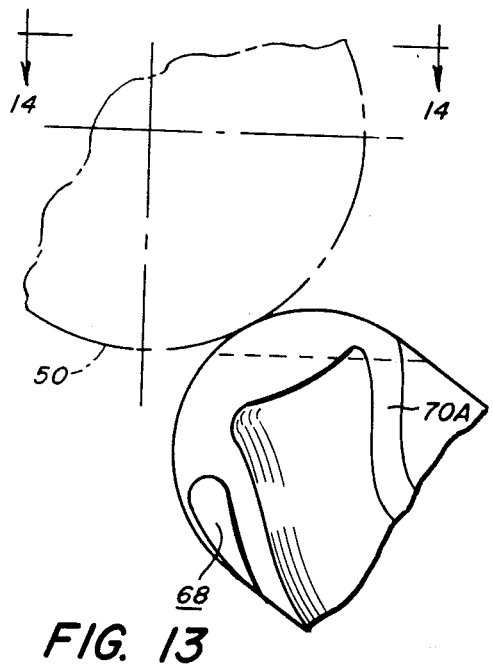
FIG. 13 is an elevational view of a first milling cutter and the ball-end end mill blank shown in FIGS. 6 and 7 just prior to engagement of the two to machine one of the teeth to the condition shown in FIG. 8.
Figure 15:
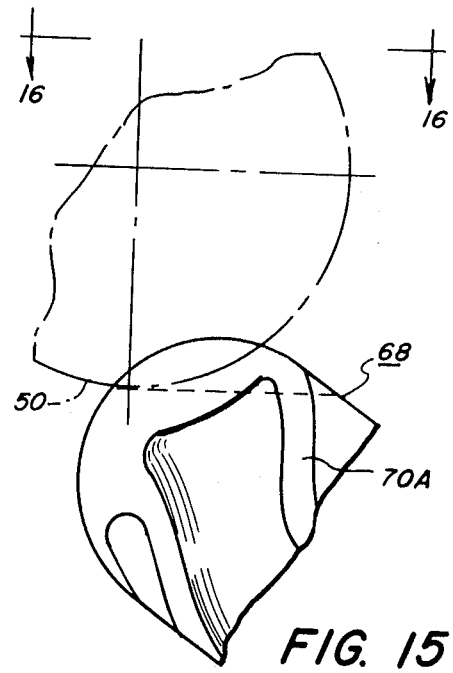
FIG. 15 is a view similar to FIG. 13 but showing the blank moved longitudinally into engagement with the cutter a short distance.
Figure 16:
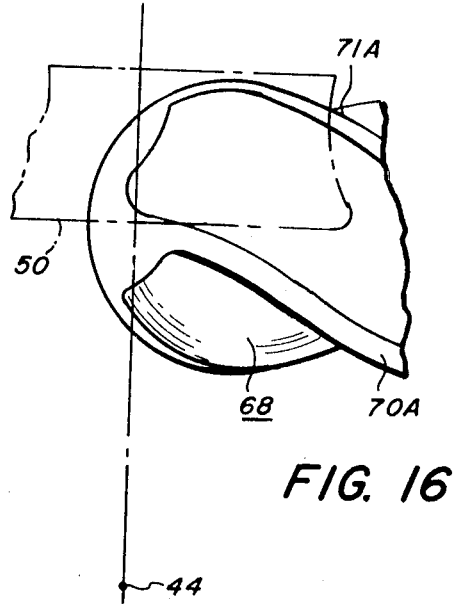
FIG. 16 is a view taken generally along the line 16-16 of FIG. 15.
Figure 14:
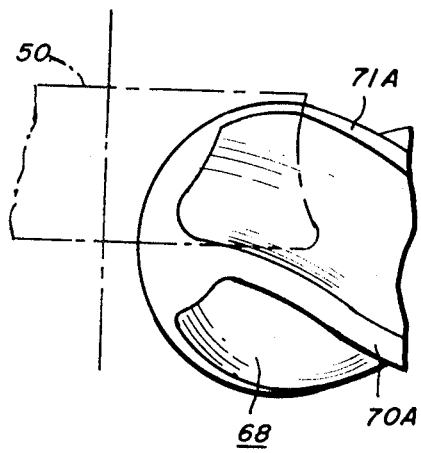
FIG. 14 is a view taken generally along the line 14-14 of FIG. 13.

The method of the present invention will be described in connection with the making of both a four-fluted ball-end end mill and a six-fluted ball-end end mill. The four-fluted ball-end end mill will be described first and this particular design has been shown and described with a 30° helix angle. It will be appreciated that ball-end end mills having a different helix angle might also be appropriately constructed for example mills having a 36, 40 or 45° helix angle. A four-fluted ball-end end mill blank 68 is selected as shown in FIGS. 6 and 7 and is appropriately secured in the sleeve 57 as shown in FIGS. 1 through 4. The angular position of the blank is appropriately adjusted as well as its axial position in the sleeve. The table 32 is then caused to travel from the position shown in FIG. 1 to the left to a position just prior to engagement of the extreme end of the blank 68 with the milling cutter 50 as shown in FIGS. 13 and 14. The cutter 50 is the first cutter utilized in accomplishing the first or rough machining operation and transforming the blank of FIG. 6 to the initially machined condition shown in FIG. 8. The table 32 moves the blank 68 straight into the cutter 50 as shown in FIGS. 15 and 16 for the distance shown. The table 32 is then caused to pivot about the pivot 44 which pivot is at a right angle to and intersects the axis of shaft 48. This causes the blank 68 to move from the position of FIGS. 15 and 16 through the position of FIGS. 17 and 18 and it stops at the position of FIG. 19. This causes the portion of the blank 68 at the ball end between teeth 70 and 71 to be removed which removed position is indicated by the reference numeral 72 in FIG. 8. This initially forms the cutting face of tooth 70 and the trailing edge of tooth 71. The milling cutter 50 and the blank 68 are then separated or brought out of contact with each other by vertical lowering of the table 32 and returning it to the position of FIG. 1. The indexing disk 62 is next rotated 90° to bring tooth 73 into the previous position of tooth 70 and to move tooth 70 to the previous position of tooth 71. The same machining procedure is again repeated to initially form the cutting face of tooth 73 and to form the trailing edge of tooth 70. This removed material position is indicated generally by reference numeral 74 in FIG. 8. The same procedure is again utilized to remove the material identified generally by the reference numerals 76 and 77 which is located between teeth 71 and 75 and 73 and 75.

The table 32 is then indexed to the left as viewed in FIG. 3 so as to appropriately bring the partially finished blank 68 in the condition shown in FIG. 8 into position relative to the milling cutter 52. The milling cutter 52 is of a slightly different configuration and is for the purpose of making the final milling cut to finish the cutting face on each of the teeth 70, 71, 73 and 75. In this respect, the procedure utilized and the movements of the blank relative to the milling cutter 52 are the same as the movements shown and described in conjunction with FIGS. 13 through 19. In this operation, the configuration of FIG. 9 is formed.

Figure 17:
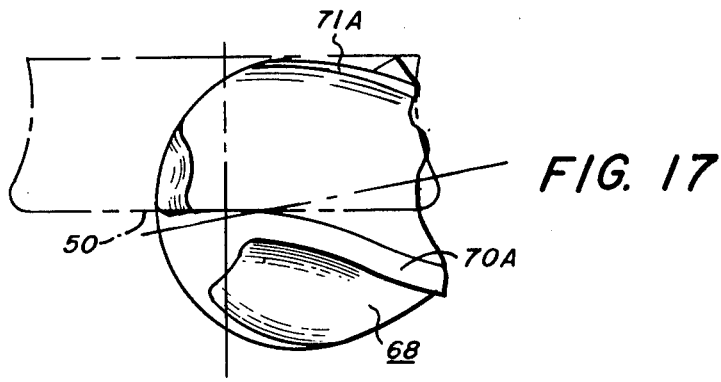
FIG. 17 is a plan view of the first milling cutter and the ball-end end mill blank with the blank rotated approximately ten degrees from the position shown in FIG. 16.
Figure 18:
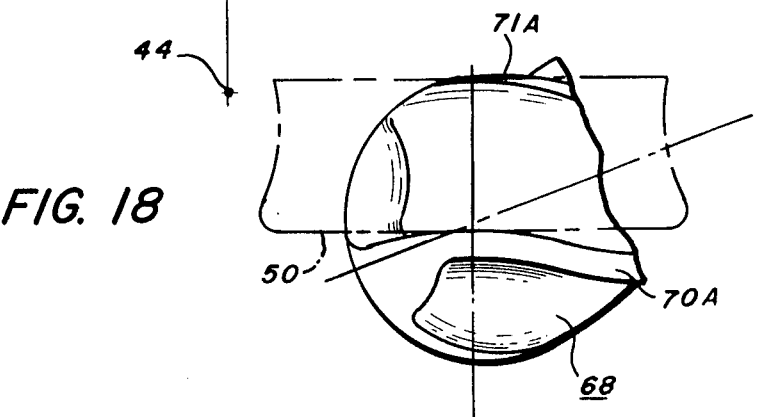
FIG. 18 is a view similar to FIG. 17 but showing the blank rotated approximately twenty degrees from the position shown in FIG. 16.
Figure 19:
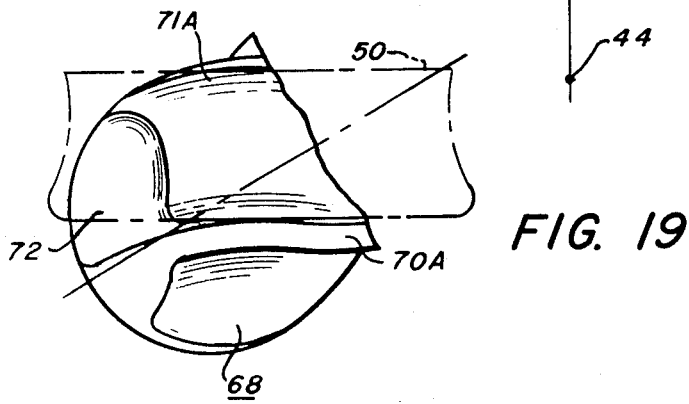
FIG. 19 is a view similar to FIGS. 17 and 18 but shows the position of the milling cutter and ball-end end mill blank at the end of the rough milling operation which completes one tooth to the condition of FIG. 8.
Figure 20:
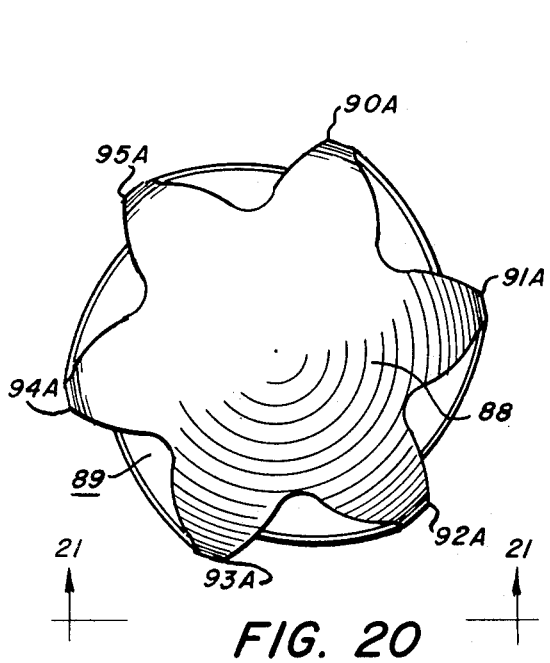
FIG. 20 is an end view of a six-fluted ball-end end mill blank.

The ball-end end mill blank 68 which is started with is shown in FIGS. 6 and 7 and is provided with a shank 64 and peripheral teeth extend in a generally helically extending direction and terminate short of the work end of the finished ball end mill. For convenience in identification these peripheral teeth are identified by the reference numerals 70A, 71A, 73A and 75A. This work end of the blank is comprised of a substantially hemispherical surface 81. It has been determined that the number of degrees of rotation which the blank must be rotated through, about the vertical pivot 44, to complete the work end of the finished ball-end end mill and properly arcuately blend into the helical peripheral teeth, is substantially equal to the helix angle of the peripheral teeth. In other words, the angular rotation shown in FIGS. 17, 18 and 19 is substantially 30° which is the helix angle of the peripheral teeth.

Figure 27:
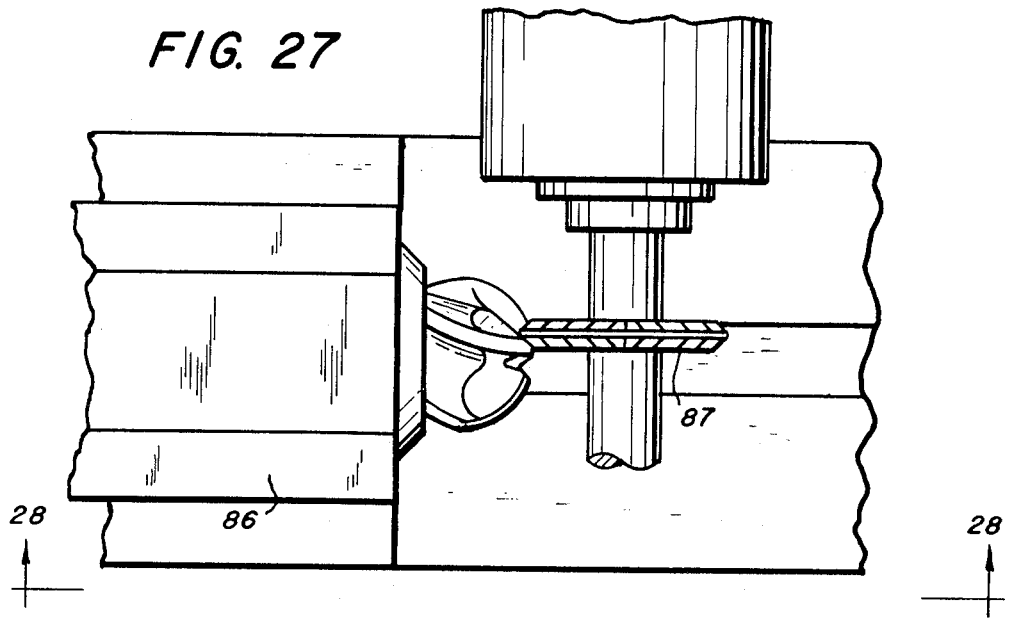
FIG. 27 shows the notching operation performed on the blank of FIG. 9 to produce the ball-end end mill of FIGS. 10 and 11.
Figure 28:
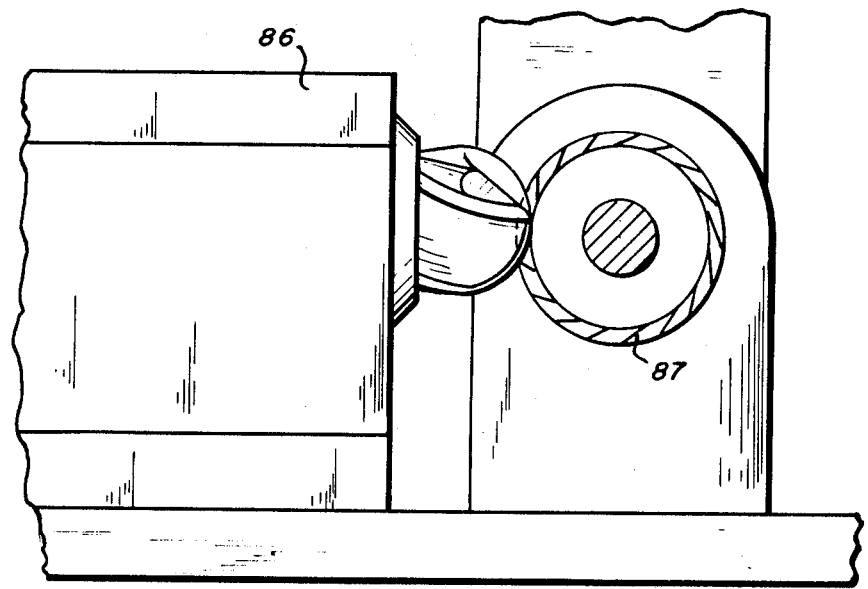
FIG. 28 is a view taken generally along the line 28-28 of FIG. 27.
Figure 29:
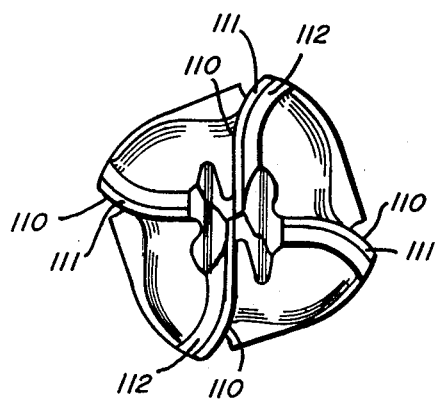
FIG. 29 is a view similar to FIG. 10 after a final grinding operation to place a cutting edge on the teeth of the four fluted ball-end end mill.
Figure 30:
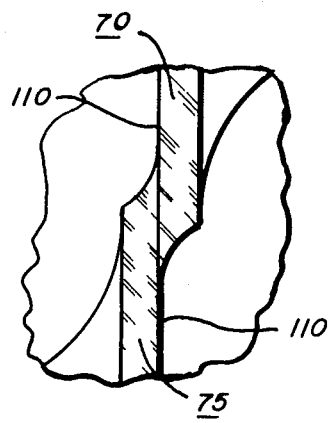
FIG. 30 is an enlarged view of a portion of FIG. 29.

FIGS. 27 and 28 show the final machining operation necessary to accomplish the teachings of the present invention. This machining operation produces two notches 83 and 84 in the work end of the ball-end end mill and are for the purpose of separating the teeth 71 and 73 from the center on the extreme end of the mill. The notches 83 and 84 are produced by holding the partially completed blank of FIG. 9 in the fixture 86 of FIGS. 27 and 28 and then moving the fixture forwardly so as to bring the end portion of the blank of FIG. 9 into contact with a milling cutter 87 which produces the notch 83. The blank is then rotated 180 degrees and the notch 84 is produced in a like manner. It should be appreciated that the above referred to machining operations to arrive at the configuration of FIGS. 10 and 11 are performed in the unhardened condition. The device of FIGS. 10 and 11 is next hardened and thereafter a grinding operation is performed to transform the device to the condition shown in FIGS. 29 and 30. The grinding operation produces cutting edges 110 on all of the teeth 70, 71, 73 and 75 and primary and secondary relief surfaces 111 and 112. It will be noted that edges 110 on teeth 70 and 75 extend substantially to the axis of the tool. This cutting edge which is produced to the center of the ball mill and for approximately 15° on either side of center has a substantially zero degree rake angle.

Figure 22:
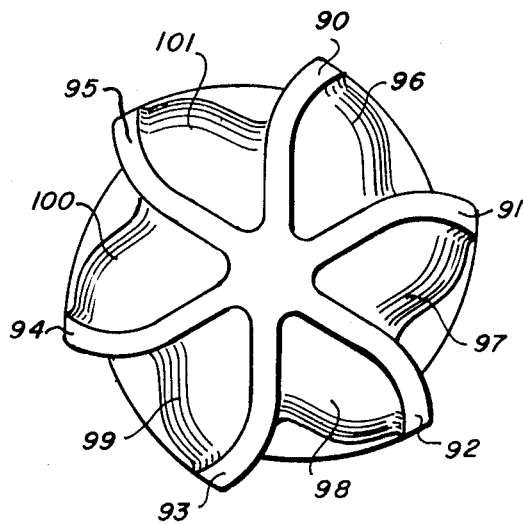
FIG. 22 is an end view of the ball-end end mill blank shown in FIG. 20 after a first or rough milling operation has been performed thereon.
Figure 21:
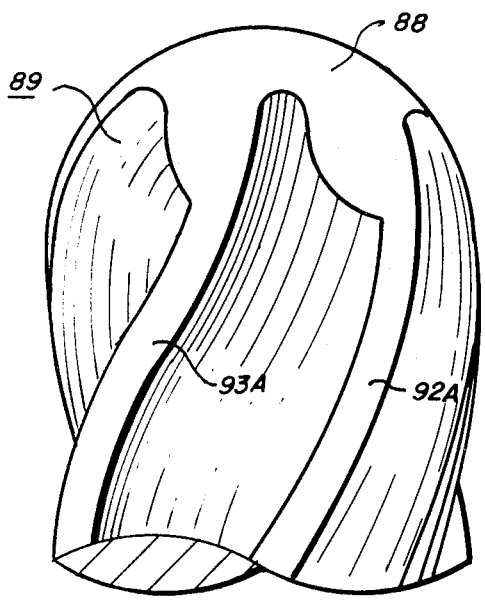
FIG. 21 is a view taken generally along the line 21-21 of FIG. 20.
Figure 23:
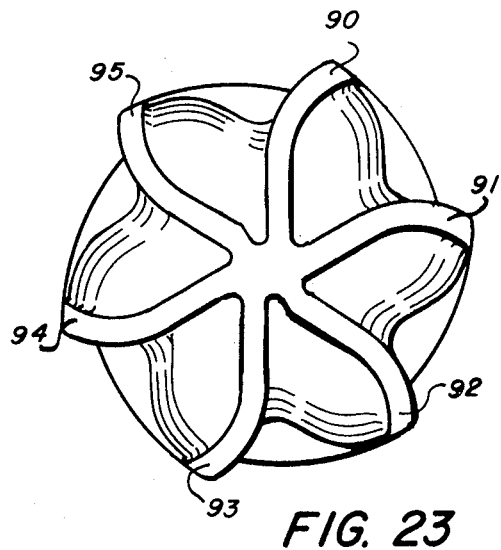
FIG. 23 is an end view of the ball-end end mill blank shown in FIG. 22 after a further milling operation.
Figure 24:
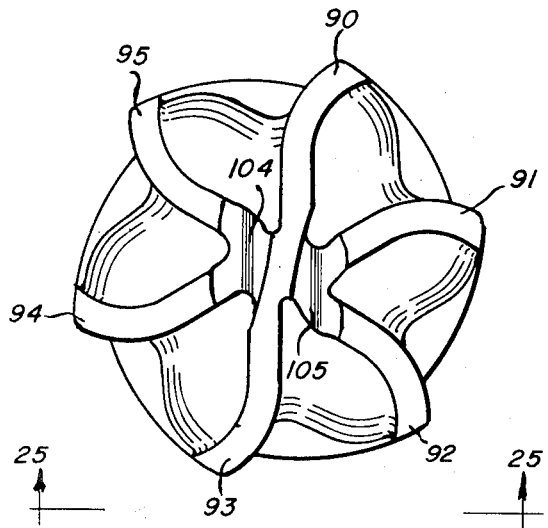
FIG. 24 is an end view of the completed ball-end end mill after a notching operation has been performed thereon to complete the same.
Figure 26:
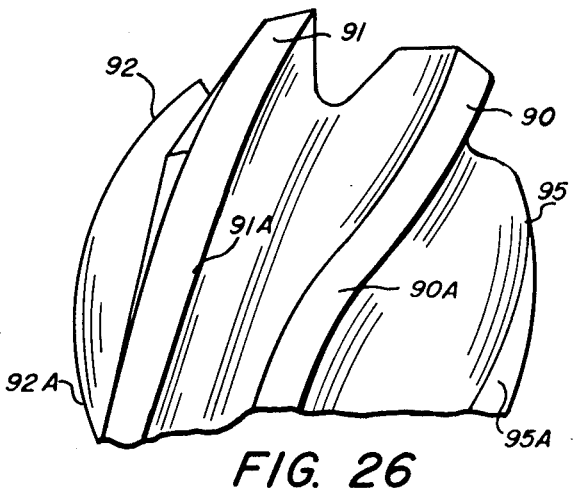
FIG. 26 is a view taken generally along the line 26-26 of FIG. 25.
Figure 25:
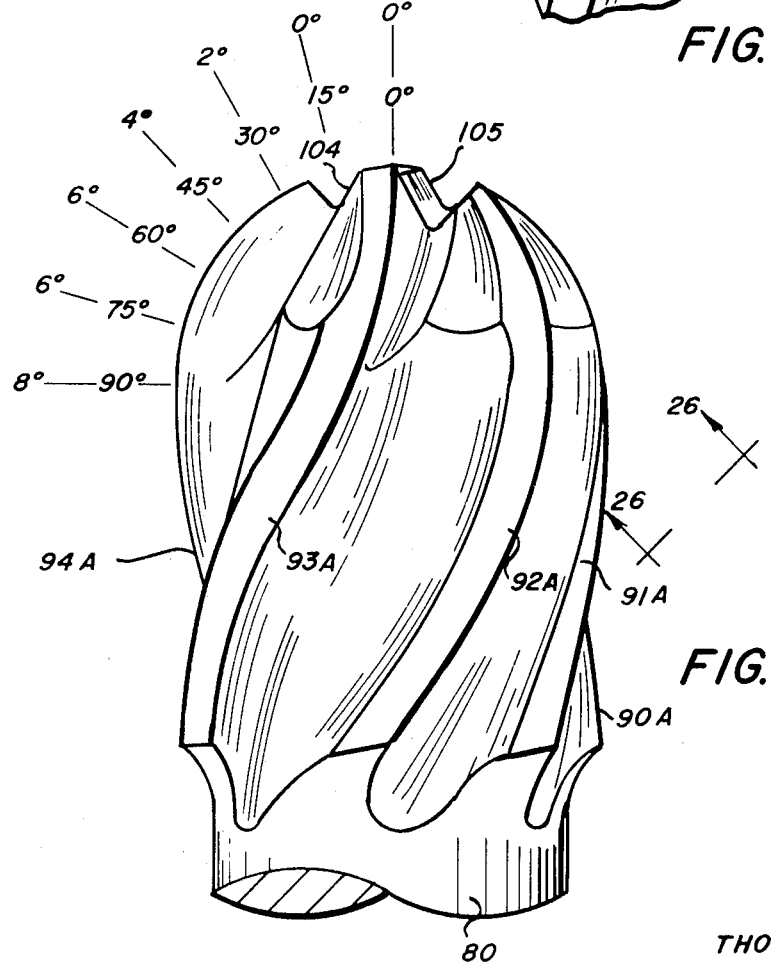
FIG. 25 is a view taken generally along the line 25-25 of FIG. 24.
Figure 31:
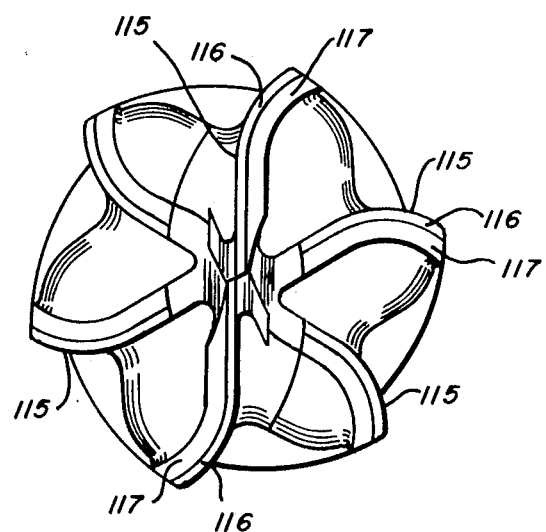
FIG. 31 is a view similar to FIG. 24 after a final grinding operation to place a cutting edge on the teeth of the six-fluted ball-end end mill.

FIGS. 20 through 26 show a six-fluted ball-end end mill blank 89 before and after various machining operations have been performed thereon. The teeth which are machined on the hemispherical end 88 of the blank have been identified by the reference numerals 90 through 95 and the peripheral teeth which are originally provided on the blank 89 are identified by numerals 90A through 95A. The blank is held in a sleeve like 57, however, since this blank is of a different diameter the sleeve must have an opening large enough to accommodate the blank. The teeth 90A through 95A on the blank 89 extend at a 30° helix angle. The blank 89, as held by the work holder, is brought into contact with the milling cutter 50 which may be of slightly different cutting edge configuration for different diameter end mills and for mills with a differing number of flutes. The same movement is imparted to the blank, namely that of bringing the blank longitudinally into contact with the cutter 50 as in FIGS. 15 and 16 and then rotating the blank through the positions of FIGS. 17, 18 and 19. The remaining five teeth are machined in the same manner by rotatively indexing the blank by means of the indexing disk 62, detent 65, and the six notches 63 which are spaced sixty degrees apart. This produces a configuration as shown in FIG. 22 and the space where material has been removed from between the teeth is identified by reference numerals 96 through 101. The table 32 is next indexed to bring the blank 89 into position relative to milling cutter 52 to machine the blank to the condition shown in FIG. 23. This is accomplished in essentially the same manner as producing the configuration of FIG. 9 from FIG. 8 except that six teeth are involved and except for milling between teeth 90 and 95 and teeth 92 and 93. In these two instances when these portions are in position to be machined by cutter 52 the automatic cycling of the apparatus causes the table to be raised vertically in the direction 41 (by cylinder 53) of on the order of .050 inches greater than normal. This brings these two cuts closer to the center of the ball mill as shown in FIG. 23. Notches 104 and 105 are next provided on the apparatus of FIGS. 27 and 28 so as to space or separate teeth 91, 92, 94 and 95 from center. These machining operations are likewise accomplished in the unhardened condition of the blank which is thereafter hardened. A grinding operation is then performed to produce the communially completed ball-end end mill of FIG. 31 which has cutter edges 115 and primary and secondary relief surfaces 116 and 117. The cutting edges on teeth 90 and 93 go substantially to center and produce a radial rake angle of substantially zero degrees a short distance on either side of center. FIG. 25 shows, for the sake of example only, the rake angles of the cutting edge at various angular positions on the ball end. FIG. 26 shows the flute contour in the ball region of this ball-end end mill as does FIG. 12 in the case of the ball-end end mill of FIG. 11.

In the event the helix angle of the mill which is being produced is different from the 30° angle as described in the present embodiment, for example, if it were 40°, then the table 32 which carries the blank through the positions of FIG. 13 through FIG. 19, would be swung through approximately a 40° angle. If the helix angle were 45° then the angle through which the blank is swung or pivoted would also be approximately 45°.

It will be apparent to those skilled in the art after reviewing the hereinabove disclosure that the present apparatus and method are capable of producing ball-end end mills from the hereinabove described blank on a mass production basis and with an accuracy of the geometry on the end of the mill which was not heretofore believed possible. This particular apparatus and method is also capable of producing a completed ball-end end mill wherein the rake angle at center and through a desired angle from center, say for example 15°, can be maintained at substantially zero. This is highly advantageous in resharpening these tools after they have once become dull from use. With this particular construction, when resharpened, the rake angle is still maintained at zero and as a result the resharpened tool can be expected to perform and does perform in a manner which is substantially identical with the manner in which it performed when it was new.

While milling cutters have been specifically disclosed above it will be appreciated that other equivalent metal removal means can be utilized for example grinders, particularly for producing tools on the order of 5/8" O.D. and under.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of making a ball-end end mill from a ball-end end mill blank which has a shank from which extend generally helical peripheral teeth which terminate short of an end which is comprised of a substantially hemispherical surface; including the steps of presenting the hemispherical end of the blank to a rotating metal removal means with the axis of the metal removal means being generally parallel to a reference plane, moving the end into contact with the metal removal means with the axis of the blank making an acute angle with the reference plane, pivoting the blank about an axis which is generally normal to the reference plane to produce a cutting face on one tooth to substantially said one end of the blank and to produce a trailing edge on an adjacent tooth to substantially said one end of the blank, separating the metal removal means and blank, indexing the blank about its own axis to successively present different angular portions of the hemispherical end of the blank to the rotating metal removal means and repeating the above operations to complete all of the plurality of teeth to the said one end of the blank.

2. The method of making a ball-end end mill from a ball-end end mill blank which has a shank from which extend generally helical peripheral teeth which terminate short of an end which is comprised of a substantially hemispherical surface; including the steps of presenting the hemispherical end of the blank to a rotating milling cutter with the axis of the cutter being generally parallel to a reference plane, moving the end into contact with the cutter with the axis of the blank making an acute angle with the reference plane, pivoting the blank about an axis which is generally normal to the reference plane to produce a cutting face on one tooth to substantially said one end of the blank and to produce a trailing edge on an adjacent tooth to substantially said one end of the blank, separating the cutter and blank, indexing the blank about its own axis to successively present different angular portions of the hemispherical end of the blank to the rotating miller cutter and repeating the above operations to complete all of the plurality of teeth to the said one end of the blank.

3. The method of claim 2, wherein material is removed at said hemispherical end to terminate each of said teeth from the extreme end of said hemispherical end except two which two extent to the extreme end.

4. The method of claim 2, wherein the pivoting of the blank about the axis which is generally normal to the reference plane is approximately the same number of degrees as the helix angle of the peripheral teeth.

5. The method of claim 4, wherein the acute angle of the axis of the blank is on the order of 35 degrees.

6. The method of making a ball-end end mill from a ball-end end mill blank which has a shank from which extend generally helically extending peripheral teeth which terminate short of an end which is comprised of a substantially hemispherical surface; including the steps of presenting the hemispherical end of the blank to a first rotating milling cutter with the axis of the cutter being generally parallel to a horizontal reference plane, moving said end into contact with the cutter in a straight line direction generally parallel to said horizontal reference plane and normal to the axis of the milling cutter with the axis of the blank making an acute angle with said horizontal reference plane, pivoting the blank about an axis which is normal to said horizontal reference plane through an angle of on the order of the same number of degrees as the helix angle of the peripheral teeth to form a cutting face on one tooth to substantially said one end of the blank and to form a trailing edge on an adjacent tooth to substantially said one end of the blank, separating the cutter and blank, rotating the blank about its own axis to successively present different angular portions of the hemispherical blank to the first rotating miller cutter and repeating the above operations to form all of the plurality of teeth to the said one end of the blank, presenting the formed teeth to a second rotating milling cutter with the formed teeth oriented in essentially the same manner as oriented to said first rotating miller cutter and moving the blank with respect to said second rotating milling cutter as it was moved with respect to said first rotating milling cutter to finish form the cutting faces on said teeth, and bringing the said one end of the blank generally axially into contact with another milling cutter to terminate each of said teeth from the said one end except two.

7. The method as claimed in claim 6, wherein at least two oppositely disposed teeth are finished formed by said second milling cutter closer to the center line of the blank than the other teeth.

* * * * *